May 6, 1958  J. H. CUNNINGHAM  2,833,904
SELF-FEEDING SOLDERING IRON
Filed June 30, 1955

INVENTOR
J. H. CUNNINGHAM
BY
A. Yates Dowell
ATTORNEY

United States Patent Office 2,833,904
Patented May 6, 1958

2,833,904

SELF-FEEDING SOLDERING IRON

John Hart Cunningham, Baltimore, Md.

Application June 30, 1955, Serial No. 519,192

6 Claims. (Cl. 219—27)

This invention relates to the working of metals and other substances and more particularly to the joining of metals or the like by the use of heat and a flux or soldering agent.

The invention relates specifically to a self-feeding soldering iron which can be held and operated with one hand while the other hand is free for other things such as, for example, holding the work.

Self-feeding soldering irons have not been satisfactory for various reasons, including the fact that they were awkward to handle, did not conform to and could not easily be held in the hand, lacked desired adjustability, retractability, positive gripping and feeding of the solder, and lacked proper insulation so that the heat was conducted to the handle so that it became uncomfortably hot.

It is an object of the invention to overcome the disadvantages enumerated and to provide an electrically heated soldering iron having a pistol grip type of handle by means of which it can be readily and comfortably held and manipulated.

Another object of the invention is to provide a self-feeding soldering iron having a retractable carriage by means of which the solder may be applied and retracted relative to the work and moved into contact with or in close proximity to the end of the soldering iron at the convenience of the operator.

A further object of the invention is to provide a self-feeding soldering iron having the features enumerated but one which can be easily held and operated with one hand, while the other hand remains free to hold the metals being joined in the desired position for other use.

Figure 1:
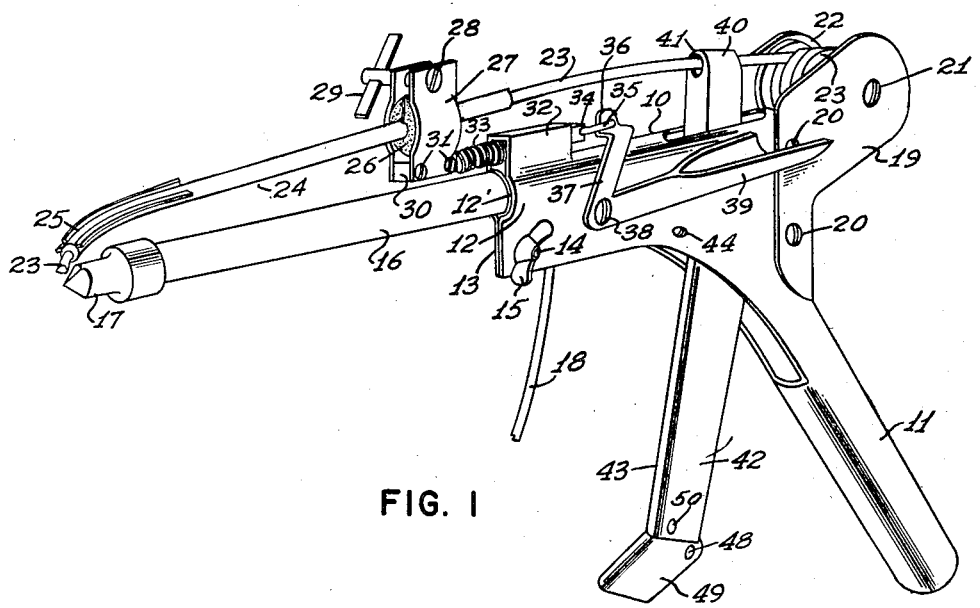

Other objects and advantages of the invention will be apparent from the following description taken in conjunction with the accompanying drawing wherein:

Fig. 1 is a perspective illustrating one application of the invention; and

Figure 2:
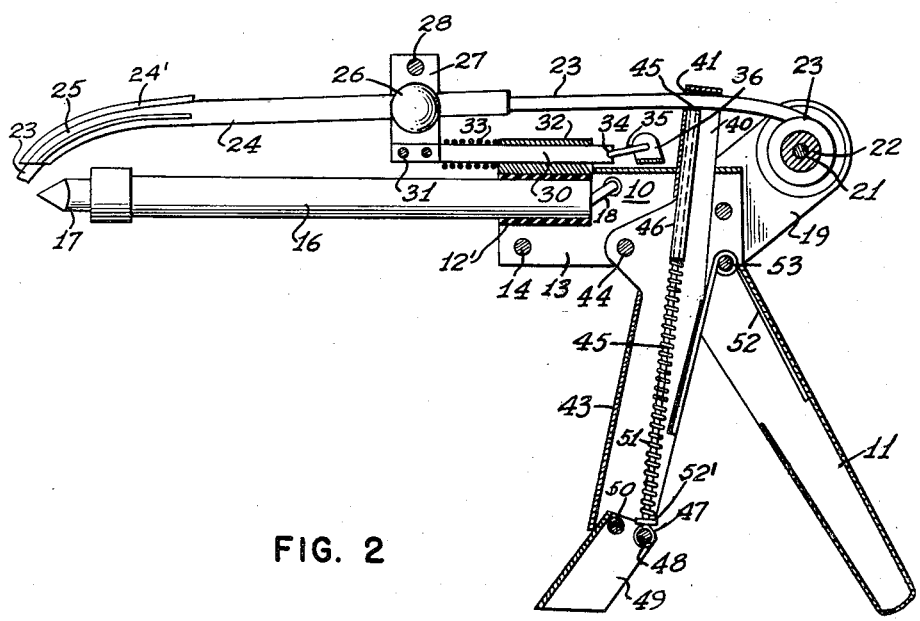

Fig. 2, a longitudinal vertical section through a handle mechanism.

Briefly stated, the invention comprises an electrically heated self-feeding soldering iron having a pistol grip handle including a fixed and a pivoted member by means of which handle the device can be easily and comfortably held in the hand and operated. An electrical heating element is detachably supported in insulated relation to the remainder of the structure in order to prevent heat being conducted to the other parts of the device. A solder-supplying tube is adjustably mounted in a retractable carriage by means of a ball and socket clamping joint to permit adjustment of the tube through which the solder is supplied. Retraction is effected by means of a thumb-operated lever which can be actuated to withdraw the tube and solder from the work as soon as soldering is completed. Solder is supplied to the soldering tube from a spool mounted on the upper rear portion of the pistol grip handle and a clutch is provided for gripping and advancing the solder, such clutch including a spring-retracted rod operated by a pivoted tip on the lower pivoted member of the pistol grip handle.

With continued reference to the drawing, the device of the present invention includes a hollow or shell like handle body 10, including a fixed rear pistol grip 11. A pair of curved gripping jaws 12 and 13 are clasped together about an insulating sleeve 12' by means of a bolt 14 and a wing nut 15. Within the sleeve 12' is clamped an electrically heated soldering iron 16 having a tip 17, such soldering iron being supplied with electricity through a dual conductor electric conduit 18 adapted to plug into an electric socket or to be connected to a source of supply of electrical energy for receiving electrical energy.

On each side of the rear of the handle 10 is mounted a bracket 19 by means of a pair of bolts 20 extending through the handle. A pivot bolt 21 extends through the center of the rearwardly extending portions of the bracket 19 and serves as a mounting for a roller 22 for a coil of solder 23 for use at the end of the tip 17 of the soldering iron when soldering.

Solder is fed from the reel 23 through a guide tube 24 which has a forward curved end 25 for directing the solder into contact with the free end of the soldering iron. In order to make the solder guiding tube 24 adjustable its rear end portion is disposed in a ball 26, split so that it may be compressed, and disposed between a pair of socket members 27 connected at their upper ends by means of a bolt 28 and a wing nut 29, and with their lower ends clamped against opposite sides of a slide bar 30 by means of a pair of bolts 31. The slide bar 30 has flat top and bottom or is substantially square in cross-section and is snugly but freely slidable in a correspondingly shaped opening of a holder 32 integrally secured on the forward upper end of the handle body 10. About the slide 30, forwardly of the holder 32, is mounted a coiled spring 33 which tends to move forwardly the above described retractable carriage 27, 30 for the solder tube.

In order to retract the solder tube, the rear end of the slide 30 is provided with an opening 34 in which one end of a ring 35 is pivotally mounted and with the other or rear end of such link pivoted in an opposed laterally offset portion 36 of an operating arm 37 pivoted on a bolt 38, said arm 37 having a rearwardly extending portion terminating in a concave thumb-engaging manipulating portion 39 so that by pressure of the thumb the solder tube can be retracted against the action of the spring 33. The tube 24 may have heat dissipating fins 24'.

In order to advance the solder, an advancing lever is disposed within the holow handle portion 10, such lever having an upper portion 40 with a tube-receiving opening 41 and having a lower gripping portion 42 which has a front curved edge 43 so that the fingers of the hand can engage the same and the fixed portion 11 of the handle to rock the lever on its pivot 44 moving the upper end 40 of the lever forwardly and rearwardly. A solder engaging rod 45 is mounted in a tube 46 and has its lower end provided with a ring 47 mounted on a rivet 48 in an actuating tip 49 mounted on a pivot 50 connecting such actuating tip to the lower end of the handle 42. The gripping action of the fingers of the hand will cause the tip 49 to force the rod 45 upwardly into contact with the solder. In order to hold this rod in retracted position, a spring 51 is mounted on the lower end of the rod beneath the lower end of the tube 46 and an abutment 52' adjacent the lower end of the rod.

The movable lower gripping portion 42 of the handle is maintained in spaced relation to the fixed gripping portion of the handle 11 by means of a coiled spring 52 mounted on a pivot 53 the arms of which coiled spring engage the members 11 and 42.

It will be apparent that a self-feeding soldering iron is provided with a hand or pistol grip comprising fixed and movable handle portions which can be easily gripped and manipulated to advance the solder through the guide tube and if desired the guide tube can be retracted to withdraw the solder from contact with the tip of the soldering iron and the work. The soldering iron possesses wide usefulness and is convenient to operate.

The present invention contemplates the joining of materials and other substances by the application of heat and with or without the use of a joining agent. After the surfaces are cleaned and the tip of the soldering iron has reached the desired temperature necessary to melt the solder the tip of the soldering iron is rubbed with solder until it is completely coated or tinned so that oxides will not form on the tip during the soldering process. Thereafter one or more of the flat faces of the soldering iron tip are placed against the work that is to be soldered to heat the same sufficiently to melt the solder at the point where the joint is to be made. After the work has been sufficiently heated the solder is applied to complete the joint. If the seam to be soldered is relatively large the soldering iron can be drawn along the seam slowly to thoroughly heat the parts to be joined and thereafter the solder can be applied to the heated parts so that it will flow into the seam.

With the present device the solder can be applied to the tip of the soldering iron to tin the same, the iron can be applied to the work to heat it, and after the work has been heated to the desired temperature solder can be applied to the heated area, or it may be retracted so that it comes in contact with or is disposed adjacent the tip of the iron, and all of this can be accomplished with one hand.

It will be obvious to those skilled in the art that various changes may be made in the invention without departing from the spirit and scope thereof and therefore the invention is not limited by that which is illustrated in the drawing and described in the specification but only as indicated in the accompanying claims.

What is claimed is:

1. A self-feeding electrically heated soldering iron comprising a pistol grip handle including a fixed and a pivoted member, an electrically heated soldering iron secured in fixed relation to said handle, insulation located between said electric heating element and said handle to prevent the conduction of heat to said handle, a spring projected retractable carriage mounted on said handle, a solder-supplying tube adjustably mounted on said carriage, a lever located on said handle for controlling the retraction of said retractable carriage so that the tube and solder therein may be applied and retracted relative to the work and moved into contact with or in close proximity to the end of the soldering iron, a holder for a spool of solder on the rear of said handle, a clutch arm carried by said pivoted member, a spring-retracted rod providing a clutch for engagement with the solder, and a spring tip pivoted on the lower end of said pivoted member operable for causing said clutch to engage said solder and advance the same in said tube.

2. A self-feeding electrically heated soldering iron comprising a pistol grip handle including a fixed and a pivoted member, an electrically heated soldering iron secured in fixed relation to said handle, insulation located between said electric heating element and said handle to prevent the conduction of heat to said handle, a spring projected retractable carriage mounted on said handle, a solder-supplying tube adjustably mounted on said carriage, a lever associated with said handle for controlling the retraction of said retractable carriage so that the tube and solder therein may be applied and retracted relative to the work and moved into contact with or in close proximity to the end of the soldering iron, a holder for a spool of solder associated with said handle, a clutch arm carried by said pivoted member, a spring-retracted rod associated with said member providing a clutch for engagement with the solder, and means operable for causing said clutch to engage said solder and advance the same in said tube.

3. A self-feeding soldering iron comprising a handle, a soldering iron secured in fixed relation to said handle, insulation located between said heating element and said handle to prevent the conduction of heat to said handle, a retractable carriage mounted on said handle, a solder-supplying tube adjustably mounted on said carriage, a lever associated with said handle for controlling the retraction of said retractable carriage so that the solder therein may be applied and retracted relative to the work and moved into contact with or in close proximity to the end of the soldering iron, a holder for a spool of solder associated with said handle, a clutch arm carried by said pivoted member, a spring-retracted rod associated with said member providing a clutch for engagement with the solder, and means operable for causing said clutch to engage said solder and advance the same in said tube.

4. A self-feeding soldering iron comprising a handle, a soldering iron secured in fixed relation to said handle, a retractable carriage mounted on said handle, a solder-supplying tube adjustably mounted on said carriage, a lever associated with said retractable carriage for retracting the same so that the tube and solder therein may be advanced and retracted relative to the work and moved in close proximity to the end of said soldering iron, a holder for a spool of solder associated with said handle, a clutch member carried by said handle including spring actuating means for engaging solder in said solder-supplying tube.

5. In combination with a device for use in uniting metal parts by the application of heat, a feed for a connecting substance comprising a carriage mounted for movement toward and from the operative end of the device for accurately guiding the connecting substances to the operative end of the device, means to advance and retract said carriage, means for advancing and retracting said connecting substance, said both means being operative whereby said carriage advancing means and said substance advancing means may be operated to discharge and retract said substance within the operative end of said device.

6. For use with a soldering iron of the type designed to progressively advance and use a length of solder, a feed for the solder comprising a carriage mounted for movement toward and from the operative end of the soldering iron for accurately guiding the solder to the operative end of the iron, means to advance and retract said carriage, means for advancing and retracting said solder, said both means being operative whereby said carriage advancing means and said solder advancing means may be operated to discharge and retract the solder within the operative end of the soldering iron.

References Cited in the file of this patent
UNITED STATES PATENTS

| 1,749,684 | Wright | Mar. 4, 1930 |
| 1,749,719 | Reiter et al. | Mar. 4, 1930 |
| 2,228,291 | Weston | Jan. 14, 1941 |

FOREIGN PATENTS

| 130,273 | Australia | July 12, 1946 |
| 494,419 | Great Britain | Oct. 21, 1938 |